(12) United States Patent
Shimshon et al.

(10) Patent No.: US 9,382,440 B2
(45) Date of Patent: Jul. 5, 2016

(54) PROTECTIVE LAYER FOR OPTICAL DEVICES

(71) Applicants: Alon Shimshon, Ra'anana (IL); Yair Rahamim, Kochav Yair (IL)

(72) Inventors: Alon Shimshon, Ra'anana (IL); Yair Rahamim, Kochav Yair (IL)

( * ) Notice: Subject to any disclaimer, the term of this patent is extended or adjusted under 35 U.S.C. 154(b) by 0 days.

(21) Appl. No.: 14/187,505

(22) Filed: Feb. 24, 2014

(65) Prior Publication Data

US 2014/0171570 A1 Jun. 19, 2014

Related U.S. Application Data

(63) Continuation-in-part of application No. PCT/IL2012/000321, filed on Aug. 27, 2012.

(30) Foreign Application Priority Data

Aug. 29, 2011 (IL) .......................................... 214883

(51) Int. Cl.
- *C08K 5/00* (2006.01)
- *C09D 129/04* (2006.01)
- *G02B 1/10* (2015.01)
- *C08F 116/06* (2006.01)

(52) U.S. Cl.
CPC ............ *C09D 129/04* (2013.01); *C08F 116/06* (2013.01); *G02B 1/105* (2013.01)

(58) Field of Classification Search
USPC ......................................................... 524/284
See application file for complete search history.

(56) References Cited

U.S. PATENT DOCUMENTS

| | | | | |
|---|---|---|---|---|
| 5,236,767 A | * | 8/1993 | Torigoe et al. | 428/32.79 |
| 5,795,425 A | * | 8/1998 | Brault et al. | 156/235 |
| 8,389,611 B2 | * | 3/2013 | Shirafuji et al. | 524/315 |
| 2003/0067568 A1 | * | 4/2003 | Hamamoto | 349/96 |
| 2004/0067849 A1 | * | 4/2004 | Tanaka et al. | 502/350 |
| 2010/0103355 A1 | * | 4/2010 | Sakamoto et al. | 349/106 |

\* cited by examiner

*Primary Examiner* — Hui Chin
(74) *Attorney, Agent, or Firm* — Roach Brown McCarthy & Gruber, P.C.; Kevin D. McCarthy

(57) ABSTRACT

A protective layer for optical devices, comprising a replaceable, scratch resistant layer appliable to an optical device in such a way such that optical properties of said optical device are substantially unaltered. The optical device is undamaged by scratches made to the scratch resistant layer by a pencil having a 3H degree of hardness or by sand. The protective layer may comprise a polyvinyl butyral resin and polyvinyl alcohol.

17 Claims, 3 Drawing Sheets

PROTECTIVE LAYER FOR OPTICAL DEVICES

CLAIM OF PRIORITY

This application claims priority as a continuation-in-part of International application number PCT/IL2012/000321, filed on Aug. 27, 2012; which claims priority to Israeli patent application number 214883, filed on Aug. 29, 2011.

FIELD OF THE INVENTION

The present invention relates to the field of optical devices. More particularly, the invention relates to a scratch resistant protective layer for optical devices, which is made of material that is designed for self-application and removal by the user of the optical device.

BACKGROUND OF THE INVENTION

Eyeglasses frequently suffer from being scratched, such as a result of falling to the floor or as a result of not being protected in a case. Repairing eyeglasses can often cost nearly as much as the cost of a new pair of eyeglasses.

Many eyeglass lenses made of plastic materials such as polycarbonate are made with a permanent scratch resistant coating, generally having a relatively hard surface. Despite the added cost of this coating, the lenses are not rendered scratch proof. Thus if the lenses having a scratch resistant coating nevertheless become scratched, they will have to be replaced.

It would therefore be desirable to provide an optical device such as eyeglasses with a replaceable scratch resistant coating.

It is an object of the present invention to provide a replaceable scratch resistant coating for optical devices.

It is another object of the present invention to provide a scratch resistant coating for optical devices, which is made of material that is designed for self-application and removal by the user of the optical device.

Other objects and advantages of the invention will become apparent as the description proceeds.

SUMMARY OF THE INVENTION

The present invention provides a protective layer for optical devices, comprising a replaceable, scratch resistant layer appliable to an optical device in such a way such that optical properties of said optical device are substantially unaltered, wherein said optical device is undamaged by scratches made to said scratch resistant layer by a pencil having a 3H degree of hardness or by sand.

As referred to herein, an "optical device" means a device that changes an image viewable thereby, or a transparent or translucent shield for protecting a viewable object, such as a shield for protecting the hands of a wristwatch.

In one embodiment, the protective layer comprises a polyvinyl butyral resin, and may further comprise 2-propanol and polypropylene glycol.

In one embodiment, the protective layer comprises polyvinyl alcohol, and may further comprise glutaraldehyde, and glycolic acid, and also an alcohol such as ethanol, t-butanol or isopropanol.

In one embodiment, the protective layer consists of a solution that is appliable onto the optical device to form a coating. The solution is manually appliable onto the optical device by means of an applicator, for allowing self-application and removal by the user of the optical device, or is automatically appliable onto the optical device by means of a liquid ejection device. The coating is removable from the optical device after being soaked in water at a temperature ranging from 25° C. to 60° C.

In one embodiment, the protective layer is a removable adhesively attachable film.

In one aspect, the optical device is a lens of eyeglasses, sunglasses, or safety glasses. The protective layer is appliable to a convex surface or to a concave surface of the lens.

The protective layer of the present invention provides the following advantages:

- It is appliable and removable by an end user, since the protective layer is made of material that is designed for self-application and removal by the user of the optical device. The protective layer may be applied at home, at the office, in the business or on vacation, whenever desired by the user.
- It is significantly more cost effective than prior art permanent scratch resistant coatings.
- It does not alter the optical properties of the optical device when applied thereto.
- It is substantially unnoticeable when applied to the optical device and therefore does not detract from the esthetic appearance of the latter.
- Remnants of the protective layer do not remain on the optical device after being removed therefrom, and therefore the optical properties of the optical device after the protective layer is removed are identical to those of an original uncoated and undamaged optical device.
- Ecological benefits are realized by being able to replace only the protective layer when scratched, and not the entire pair of glasses, thereby reducing the amount of unrecyclable debris.

DETAILED DESCRIPTION OF PREFERRED EMBODIMENTS

Figure 1:
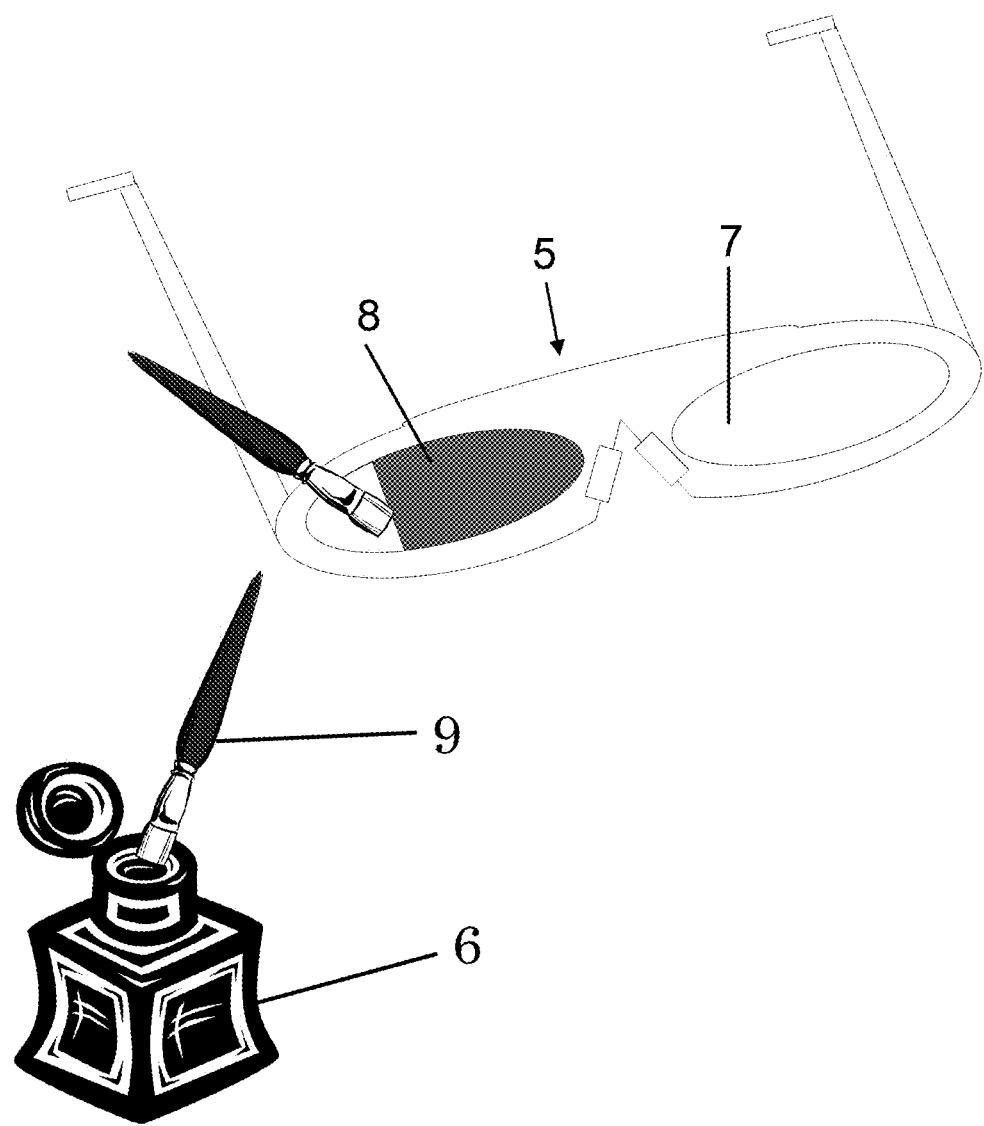
FIG. 1 is a schematic illustration of a first embodiment of the protective layer of the present invention, as being manually applied to an optical device.

FIG. 1 illustrates a first embodiment of the present invention, showing a pair of eyeglasses 5 to one or two lenses of which is applied a replaceable scratch resistant coating 8. Scratch resistant coating 8 consists of a solution 6 that is appliable by means of an applicator 9, e.g. a brush made of non-abrasive bristles, a brush head made of a spongy material, and an applicator having ejectable solution, to one or two faces of an eyeglass lens 7.

Figure 2:
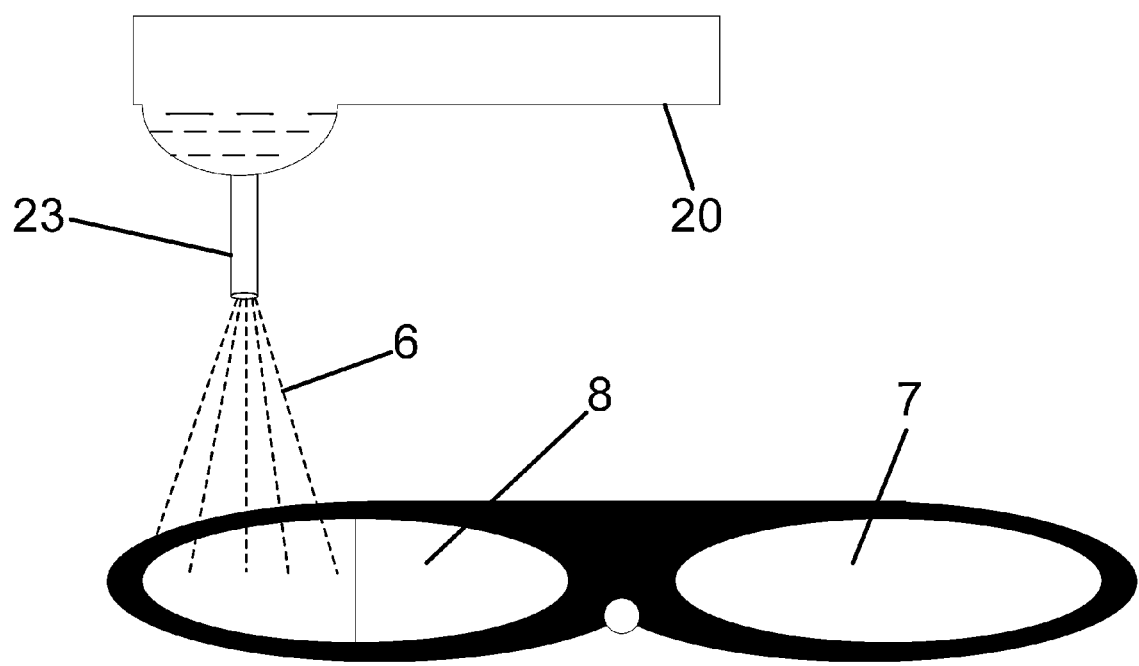
FIG. 2 is a schematic illustration of a solution being automatically applied to an optical device.

Alternatively, as shown in FIG. 2, solution 6 is appliable to lens 7 by means of a liquid ejection device 20, which may be computer controlled to be displaced at a predetermined rate and in a predetermined direction so that the solution discharged from nozzle 23 or any other exit port will suitably fall on the lens to form a substantially uniform coating.

The thickness of coating 8 ranges between 4-15μ. When coating 8 is desired to be replaced, such as when scratched, the coated eyeglass lens is first placed in readily accessible, warm to hot water at a temperature ranging from 25-60° C., which is not reactable with the lens or with the eyeglass frame. The coating is then rubbed until it is able to be removed from the lens.

It will be appreciated that coating 8 can be applied to any other desired optical device, such as the lens of a telescope, camera, night vision device and binoculars, or to any other transparent or translucent water resistant element, such as the windshield of a motor vehicle, the window of a building, the transparent protective element of a wristwatch through time indication is possible, and a firearm sight.

The coating may be a polyvinyl alcohol (PVA) based coating (manufactured by Sekisui Specialty Chemicals Dallas, Tex. U.S.A.), which has good solubility in warm water. The PVA may be Celvol 205. The PVA may be hydrolyzed at a percentage of 87-89 wt % (i.e., % by weight) and diluted at a percentage of 10 wt % PVA within deionized water. The coating may also comprise PVA diluted at a concentration of 96 wt % in water, glutaraldehyde having a concentration of 25 wt % in water, and glycolic acid having a concentration of 50 wt % in water. Glutaraldehyde in the presence of an acid generates a reaction for cross-linking PVA, thereby making it less water-soluble after drying. The glycolic acid was selected, since it is a water-soluble organic acid with few environmental and safety problems.

The coating may also be a Butvar based coating, i.e. a polyvinyl butyral resin. The Butvar may be Butvar B-98 (manufactured by Sigma-Aldrich, St. Louis, Mo., U.S.A.), which is the adhesive used in the manufacture of the Triplex safety glass in car windscreens and therefore, is proven to have good optical clarity, transparency and long-term stability to sunlight. Butvar was also selected since it has low water solubility.

The coating may also comprise 2-propanol (IPA) and polypropylene glycol (PPG). IPA is the solvent that evaporates, in order to form the film. If the solvent is too volatile the polymer precipitates and the film is cloudy. If the solvent is not sufficiently volatile, it does not fully leave the polymer and the film remains sticky. In this case the IPA is has the optimal performance. The PPG is not volatile and remains in the film as a plasticizer.

The thickness of the coating ranges from 6-8 microns.

The thickness of the Butvar and the PVA layer may range between 4-15μ.

Figure 3:
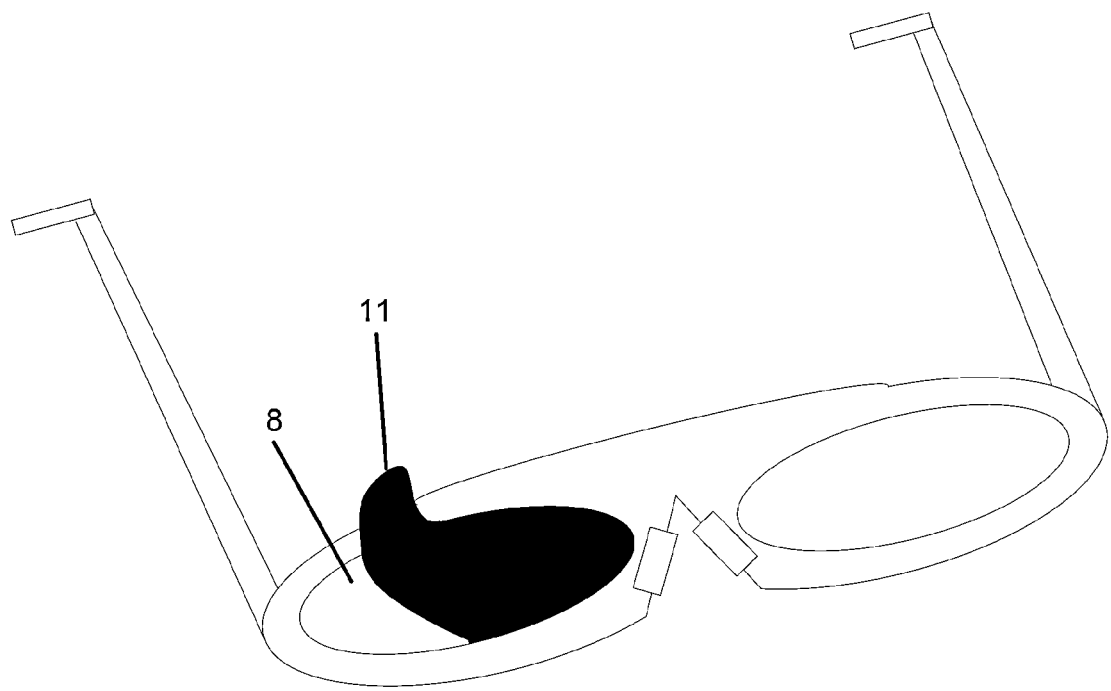
FIG. 3 is a schematic illustration of a second embodiment of the protective layer of the present invention, being applied to an optical device.

FIG. 3 illustrates a second embodiment of the present invention wherein the replaceable scratch resistant coating is a film 11 that is adhesively attachable to, and removable from, an eyeglass lens, or any other suitable transparent or translucent water resistant element. Film 11 may be applied to one face or to both faces of lens 11 in such a way that the optical properties of the lens are unaltered. The same materials and thicknesses may be employed as described hereinabove with respect to the first embodiment. The adhesive layer has a thickness ranging from 4-15 microns so that the optical properties of lens will be substantially unaltered.

EXAMPLE 1

A solution of PVA-based coating of 12.019 g was prepared from:
9.8 g solution of PVA, Celvol 205 hydrolyzed at a percentage of 87-89 wt % and diluted at a percentage of 10 wt % within deionized water. This gave 0.98 g PVA and 8.82 deionized water;
1.8 g of 96 wt % ethanol. This gave 1.728 g ethanol and 0.072 g deionized water;
0.314 g of glutaraldehyde having a concentration of 25 wt % in deionized water.
This gave 0.078 g glutaraldehyde and 0.236 g deionized water;
0.105 g of glycolic acid having a concentration of 50 wt % in deionized water.
This gave 0.053 g glycolic acid and 0.053 g deionized water.

The PVA was heated to 40-50° C. in order to be dissolved.

The solution was filtered by a Millipore syringe-driven unit SLHV 033NS (manufactured by millipore MA, U.S.A.) with filter paper having a pore size of 0.45 microns, and was then ready for use.

A fine paint brush was used to apply the solution to the front convex surface of CR39 lenses. The coated lenses were allowed to dry overnight under a glass lid and inside a laminar flow hood. The coated lenses were then dried at 37° C. during a second night and in an oven at 60° C. during a third night.

The thickness of an equivalent film measured on a flat glass microscope slide was 5-6 microns. The film was very clear and did not distort the optical properties of the lenses.

A drop of water was allowed to remain on the film for 15 minutes, and left a faint stain after being evaporated. This PVA-based coating is therefore useful for use in dry environments or as sunglasses.

EXAMPLE 2

A Butvar-based coating of 201 g was prepared from a solution of 5.0 wt % Butvar B-98, 94.5 wt % 2-propanol (IPA), and 0.5 wt % polypropylene glycol (PPG). The Butvar was dissolved in the IPA while being heated at 40° C. and stirred. The PPG was then added. The solution was filtered by a Millipore filter system with filter paper HVLP (manufactured by millipore MA, U.S.A.) having a pore size of 0.45 microns, and was then ready for use.

A polyurethane foam brush was used to uniformly apply the solution to the front and rear surfaces of the lens without altering its optical properties. The coated lens was allowed to dry at room temperature in a desiccator for two days. An optically clear, water resistant coating was obtained.

The thickness of an equivalent film measured on a flat glass microscope slide was 6-8 microns.

EXAMPLE 3

In each of the four tests summarized in Table 1, the scratch resistance of two identical eyeglass lenses was compared, the first lens of a pair being uncoated and the second being coated on both the front and rear surfaces. A Butvar-based coating was applied for the first three tests, and a PVA-based coating was applied for the fourth test.

The following were used to test the scratch resistance:
Pencils ex Mirado (USA) with an increasing degree of hardness, 1 B, 2 HB, 3 H
Common sand After the applied coating dried, these materials, in an order of an increasing abrasivity, i.e. ability to effect scratches, were brought in contact with the uncoated lens by rubbing until a scratch mark appeared on the lens surface. Rubbing was made using sand, since it contains hard elements such as Silicon which may damage articles being in contact with them. Also, sand is widespread and often causes damages to optical devices.

Common sand was considered more abrasive than the graphite of a pencil having a 3H degree of hardness. The same materials were then applied to the coated lens until a scratch appeared on the coating.

The coating was removed by gentle rubbing in water at a temperature of 50° C. After drying, the lens surface which was underlying the coating was inspected, to determine whether the scratch mark had penetrated the underlying lens surface.

The results for the uncoated and coated lenses are summarized below in Table 1:

EXAMPLE 4

Tables 2 and 3 provide the composition of a plurality of PVA and Butvar samples, respectively, that were produced, including an indication of whether they are water resistant.

With respect to the samples of Table 2, glycolic acid was used to catalyze the cross-linking reaction between the PVA and the glutaraldehyde. The range of concentrations used for PVA was 5-10% in water. The range of concentrations of glutaraldehyde was 1-10% relative to the PVA.

TABLE 1

| Type of Eyeglasses | Uncoated | Coated | Lens Material |
|---|---|---|---|
| Purple Tinted Commercially Available Sunglasses | Lens surface was not scratched by pencils, but was scratched by sand. | Butvar coating was not scratched by pencils. Sand tore the coating, but underlying lens surface was undamag | Unknown |
| Commercially Available Eyeglasses | Lens surface was not scratched by pencils, but was scratched by sand. | Butvar coating was not scratched by pencils. Sand tore the coating, but underlying lens surface was undamaged. | Unknown |
| Safety Glasses | Lens surface was scratched by pencils 2HB and 3H. | Butvar coating was scratched by pencils 2HB and 3H, but underlying lens surface was undamaged. | Polycarbonate |
| Black Lens | Lens surface was not scratched by pencils or by sand. | PVA coating was not scratched by pencils or by sand. | CR39 |

With respect to Table 3, some samples were produced from different alcohols such as ethanol, t-butanol and isopropanol, which served as solvents. The concentration of the Butvar solutions may range from 5-10 wt %. An additional 10 wt % relative to Butvar is preferably added to prevent the appearance of waves in the formed film.

TABLE 2

| Sample No. | % PVA in water | Glutar Aldehyde, % of PVA | Glycolic Acid 50% in water, (drops) | Additives | Resistance to tap water 15 min Y/N | Surface | Observations |
|---|---|---|---|---|---|---|---|
| 1-10-10-1 | 5 | 1 | 3 | | Y | glass | Transparent |
| 1-10-10-2 | 5 | 2 | 3 | | N | Glass | Transparent |
| 1-10-10-3 | 5 | 1 | 3 | | Y | Lens CR39 | Transparent |
| 1-10-12-1 | 5 | 15 | 3 | | | | Crosslinked very quickly |
| 1-10-12-2 | 5 | 7.5 | 3 | | Y | Lens CR39 | Transparent |
| 1-10-13 | 5 | 7.5 | 3 | 6 hours at 65° C. | 5 min Y 15 min N | Lens CR39 | Transparent |
| 1-10-14 | 10 | 8 | 3 | EtOH 15% of PVA solution | N | Lens CR39 | Transparent |
| 1-10-15 | 10 | 10 | 3 | EtOH 15% of PVA solution | N | Glass | Transparent |

Where EtOH denotes Ethyl Alcohol. From the table, it seems for example, that the material sustained 5 min. contact with flowing tap water but did not exceed 15 min.

The advantages of using glycolic acid are:
Water soluble;
Should not be ingested but is otherwise harmless in solution;
Has no smell, color or vapors.
Not dangerous to use outside of the laboratory such as in an optometrist's office
used in health care products.
Compatible with PVA and will not cause optical distortion to the film when the water dries.

TABLE 3

| Sample No | % Butvar 98 B in Solvents | PPG % rel. to Butvar | Resistance to 15 min tap water Y/N | Surface | Observations |
|---|---|---|---|---|---|
| Ethanol | | | | | |
| 1-10-17-1 | 5 | | Y | Glass | Not transparent |
| 1-10-17-2 | 10 | | Y | Glass | Transparent, waves |
| t-Butanol | | | | | |
| 1-10-19-1 | 5 | | Y | Glass | Transparent |
| 1-10-20-2 | 5 | | Y | Lens CR39 | Not good |
| IPA | | | | | |
| 1-10-18-1 | 5 | | Y | Glass | Transparent, waves |
| 1-10-18-2 | 10 | | Y | Glass | Transparent, waves |
| 1-10-19-2 | 5 | 10 | Y | Glass | Transparent |
| 1-10-20-1 | 5 | 10 | Y | Lens CR39 | Transparent, waves |
| 1-10-20-1' | 5 | 10 | Y | Lens CR39 + lid | Transparent |
| 1-10-21-1 | 5 | 10 | Y | Spectacles | Transparent but some spots |
| 1-10-21-2 | 5 | 10 | Y | Sunglasses | Transparent but some spots |

Ethanol, t-Butanol and IPA are solvents with which the Butvar has been mixed, as indicated in the table above.

The lens has been covered with a lid to slow the rate of drying. As a result. sample 20-1 had waves while sample 20-1' was transparent.

EXAMPLE 5

The protective ability and the removability of six coatings were tested by means of a bellow type Blower HD 6050 manufactured by Hyundai, a 9 cm×9 cm scouring pad manufactured by Sano-Sushi, Israel, and common Israeli sea sand.

The scouring pad was placed on top of an unscratched lens having good optical properties, and the blower was positioned above the scouring pad. Two tablespoons of filtered sand was poured on the scouring pad. Once the blower was activated, the scouring pad was pressed onto the lens by means of the air pressure. The blower was then moved in circles and along varying angles, to simulate a scratch effecting operation.

The following are the results of the tests:
1. A Butvar-based coating applied onto a polycarbonate lens was soaked for approximately 30 seconds in hot water of approximately 50° C. and was easily separated from the lens without having to be touched. The coating was scratched, but the underlying lens was undamaged. Following separation of the coating from the lens, the optical properties and sharpness of view through the lens were identical as those of the lens prior to being coated.
2. A Butvar-based coating applied onto a purple colored lens was soaked for approximately 30 seconds in tap water at room temperature and could not be separated from the lens. The coating was able to be peeled from the lens only after being rubbed for an additional 30 seconds. When the coated lens was soaked in hot water of approximately 50° C., it was separated from the lens without having to be rubbed. Some of the coating material remained on the edge of the lens, and was easily removed after having been rubbed. The coating was scratched, but the underlying lens was undamaged. Following separation of the coating from the lens, the optical properties and sharpness of view through the lens were identical as those of the lens prior to being coated.
3. A Butvar-based coating applied onto a Brown #3 CR-39 sunglass lens purchased from the classiceyeglasses store on ebay.com was soaked for approximately 30 seconds in tap water at room temperature and could not be separated from the lens. The coating was able to be peeled from the lens only after being rubbed for an additional period of 30 seconds. When the coated lens was soaked in hot water of approximately 50° C., it was separated from the lens without having to be rubbed. Some of the coating material remained on the edge of the lens, and was easily removed after having been rubbed. The coating was scratched, but the underlying lens was undamaged. Regions of the lens that were not coated became permanently scratched as a result of being contacted by the scouring pad, and the scratches could not be removed after the lens was soaked. Following separation of the coating from the lens, the optical properties and sharpness of view through the portions of the lens that were coated were identical as those of the lens prior to being coated.
4. A Butvar-based coating applied onto clear and frameless, round CR-39 lens purchased from the pampa_stern store store on ebay.com was soaked for approximately 30 seconds in tap water at room temperature and could not be separated from the lens even after intensive rubbing. When the coated lens was soaked in hot water of approximately 50° C., it could be separated from the lens only after being intensively rubbed for two minutes. Only two intensive and deep scratches were transmitted through the coating to the underlying lens, while the vast majority of scratches were absorbed by the coating and were not transmitted to the lens. The scratches on the surface of lens to which was not applied a coating were obvious to the naked eye and permanent. Following separation of the coating from the lens, the optical properties and sharpness of view through the lens were identical as those of the lens prior to being coated.
5. A PVA-based coating applied onto brown CR-39 lens having UV protection purchased from an optician was soaked for approximately 30 seconds in tap water at room temperature, rapidly causing creases to appear on the edges of the lens while such a rapid reaction was not seen near the center of the lens. When the coated lens was soaked in hot water of approximately 50° C., it was easily separated from the lens after being rubbed. Tens of scratches that were on the coated surface of the lens almost totally disappeared, while scratches permanently remained on the uncoated surface of the lens. Following separation of the coating from the lens, the optical properties and sharpness of view through the lens were identical as those of the lens prior to being coated.

6. A Butvar-based coating was completely applied onto a clear lens for reading glasses, except for a small area near the center of the lens. The coating was soaked for approximately 30 seconds in tap water at room temperature and could not be separated from the lens. The coating was able to be peeled from the lens only after being rubbed. When the coated lens was soaked in hot water of approximately 50° C., it was separated from the lens without having to be rubbed. Some of the coating material remained on the edge of the lens, and was easily removed after having been rubbed. Two scratches were formed in the central uncoated portion of the lens, while the vast majority of scratches were absorbed by the coating and were not transmitted to the lens. Following separation of the coating from the lens, the optical properties and sharpness of view through the lens were identical as those of the lens prior to being coated.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A protective layer for optical devices, comprising a single replaceable, scratch resistant layer formed from a solution consisting of
   5 to 10 wt % of polyvinyl alcohol,
   0.75 to 1.5 wt % of ethanol,
   0.05 to 1.0 wt % of glutaraldehyde,
   0.44 wt % of glycolic acid, and
   deionized water,
said layer being irremovably appliable to an optical device in such a way such that optical properties of said optical device are substantially unaltered,
   wherein said optical device is undamaged by scratches made to said scratch resistant layer by a pencil having a 3H degree of hardness or by sand,
   wherein said scratch resistant layer is removable from the optical device only after being submerged in water at a temperature ranging from 25° C. to 60° C.

2. The protective layer according to claim 1, wherein the scratch resistant layer consists of
   8.15 wt % of polyvinyl alcohol,
   0.75 to 1.5 wt % of ethanol,
   0.65 wt % of glutaraldehyde,
   0.44 wt % of glycolic acid, and
   76.39 wt % of deionized water.

3. The protective layer according to claim 1, which is a removable adhesively attachable film.

4. The protective layer according to claim 1, wherein the solution is appliable onto the optical device to form a coating.

5. The protective layer according to claim 1, wherein the optical device is a lens of a telescope, a camera, a night vision device, binoculars, eyeglasses, sunglasses, safety glasses, a shield for protecting a wristwatch, a windshield of a motor vehicle, a window of a building or a firearm sight.

6. A protective layer for optical devices, comprising a single replaceable, scratch resistant layer formed from a solution consisting of
   5 to 10 wt % of a polyvinyl butyral resin,
   94.5 wt % of a 2-propanol solvent, and
   0.5 to 1.0 wt % of polypropylene glycol,
said layer being irremovably appliable to an optical device in such a way such that optical properties of said optical device are substantially unaltered,
   wherein said optical device is undamaged by scratches made to said scratch resistant layer by a pencil having a 3H degree of hardness or by sand,
   wherein said scratch resistant layer is removable from the optical device only after being submerged in water at a temperature ranging from 50° C. to 60° C.

7. The protective layer according to claim 6, wherein the scratch resistant layer consists of 5 wt % of polyvinyl butyral resin, 94.5 wt % of 2-propanol solvent, and 0.5 wt % of polypropylene glycol.

8. The protective layer according to claim 6, wherein the solution is appliable onto the optical device to form a coating.

9. The protective layer according to claim 6, wherein the optical device is a lens of a telescope, a camera, a night vision device, binoculars, eyeglasses, sunglasses, or safety glasses.

10. The protective layer according to claim 9, which is appliable to a convex surface or to a concave surface of the lens.

11. The protective layer according to claim 6, wherein the optical device is a shield for protecting a wristwatch, a windshield of a motor vehicle, a window of a building or a firearm sight.

12. The protective layer according to claim 9, wherein the lens is made of a plastic material or glass.

13. The protective layer according to claim 8, wherein the solution is manually appliable onto the optical device by means of an applicator, for allowing self-application and removal by the user of the optical device.

14. The protective layer according to claim 8, wherein the solution is automatically appliable onto the optical device by means of a liquid ejection device.

15. The protective layer according to claim 6, which is a removable adhesively attachable film.

16. The protective layer according to claim 8, wherein the coating has a thickness ranging between 4 and 15 microns.

17. The protective layer according to claim 4, wherein the coating has a thickness ranging between 4 and 15 microns.

* * * * *